Feb. 6, 1968    H. A. RASCHKE    3,367,001

CLOSABLE PULLING HOOK

Filed Dec. 27, 1965

INVENTOR
HERBERT A. RASCHKE
BY Townsend and Townsend
ATTORNEYS

3,367,001
CLOSABLE PULLING HOOK
Herbert A. Raschke, Greenbrae, Calif., assignor to E. D. Bullard Company, Sausalito, Calif.
Filed Dec. 27, 1965, Ser. No. 516,404
5 Claims. (Cl. 24—241)

ABSTRACT OF THE DISCLOSURE

A safety gate for a pulling hook including a single rigid elongated hollow member slidably spring-biased across the throat of the pulling hook for pivotal movement between a throat spanning position and a throat clearing position. The tip of the hook is provided with a portion of reduced cross section for mating with the outer end of the gate when the gate is in the throat spanning position.

---

This invention relates to a pulling or hoisting hook having a securely closable gate thereon to prevent inadvertent dislodgement of a load from the hook and to prevent entry into the hook of interfering cables, guy lines, etc.

The specific embodiment of the present invention to be described in more specific detail hereinafter includes a hook having a throat opening that extends approximately parallel to the direction of force of a pulling or hoisting line to the hook and includes a gate spanning or bridging the opening which gate is opened by applying force to the gate in a direction approximately the same as the direction of the force of the hoisting line. Accordingly, any obstructions which the hook encounters in use tend to more firmly close the gate thereby preventing inadvertent dislodgement of the load and preventing entry of obstructions into the hook basket.

The principal object of the present invention is to provide a hook useful both in congested areas such as areas where rigging, such as guy wires, is present, and in pulling conductor wires through a conduit where freedom from unintentional dislodgement of the load is particularly important. This object is achieved in the present invention by providing a gate which has on the free end thereof a socket for circumscribing a mating portion on the hook tip and which includes a spring or the like for resiliently biasing such gate socket onto the tip. The structure is arranged so that obstructions which the hook may encounter in its hoisting or pulling movement tend to urge the gate more firmly into engagement with the hook tip and thereby virtually eliminate possibility of inadvertent opening of the gate.

Another object of the present invention is to provide a hook and gate structure that can be intentionally closed and opened with substantial facility while at the same time being highly immune to inadvertent opening. Achievement of this object is obtained by providing a hook gate which is pivotally and slidably mounted on the hook and which gate can be opened by first sliding the hook longitudinally against a spring force and then pivoting the gate outwardly to open the throat to permit a load to be inserted into or removed from the hook basket. Rapid closure of the gate is made possible by provision on the hook tip of a ramp portion up which the gate moves in response to pivotal urging of the gate by the user of the hook.

Still another object of the present invention is to provide a hook and gate structure in which the gate can be moved to an open position and there retained until intentionally closed by the user of the hook. This object is attained by provision of a cam surface having a flat or planar portion thereon over which a resiliently biased portion of the gate moves. The flat portion of the cam surface is so disposed that the gate spring engages thereagainst when the hook is in an opened position and is movable from such open position only by pivotal force applied by the user of the hook.

These and other objects will be more apparent after referring to the following specification and accompanying drawing in which.

Figure 1:
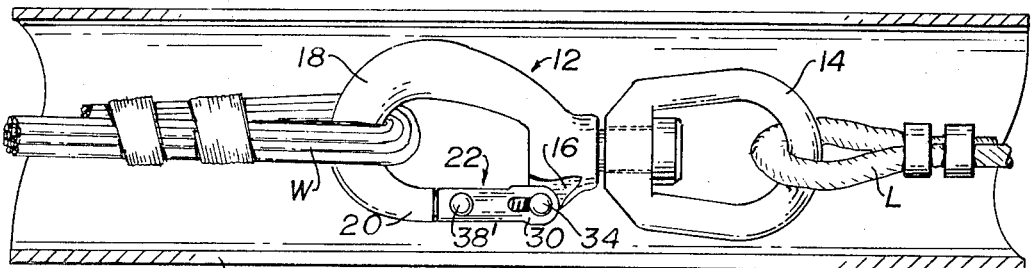
FIG. 1 is a side elevation view of a hook according to the present invention shown in use in pulling electrical conductors through a conduit.

Referring more particularly to the drawing, reference numeral 12 indicates a hook body having a swivel or like line attaching expedient 14, a heel portion 16, and a curved load supporting basket portion 18, which terminates at its outer end in a tip 20. Tip 20 lies substantially opposite heel 16 to define a space therebetween referred to in the art and the following specification as the throat or throat opening. Extending across the throat opening is a gate 22.

Gate 22 is here shown as a square tubelike member having an inner wall 24, an outer wall 26 and side walls 28 arranged in a generally square cross-sectional configurtion. At the inner end of gate 22, that is, the end adjacent heel 16, inner and outer walls 24, 26 are foreshortened so that side walls 28 extend toward heel 16 to define hinge plate members 30. Each hinge plate member is formed with a slot 32 which is elongated in a direction longitudinal of gate 22, the respective slots being aligned across the square opening formed by the gate walls. Heel portion 16 has protruding from each lateral surface thereof a pin or rivet 34 sized for sliding engagement within respective slots 32 in the gate. As can be seen most clearly in FIG. 2, slot 32 is so oriented and dimensioned that at one extreme position of the slot with respect to pin 30 gate 22 will bridge the throat opening between tip 20 and heel 16, and at the other extreme position the gate will clear the throat opening so as to be pivotally movable outwardly of the throat. For biasing the gate toward the first mentioned extreme position a compression coil spring 36 is disposed within a longitudinally extending channel centrally of gate 22 to bear at one end thereof against an inner surface portion 16' of heel 16 and at the other end against a cross pin 38 extending between walls 28 of the gate. Cross pin 38 is preferably formed by a rivet so as to impart additional strength to the gate structure and includes protruding heads 38' to afford a finger grip on the gate.

Figure 3:
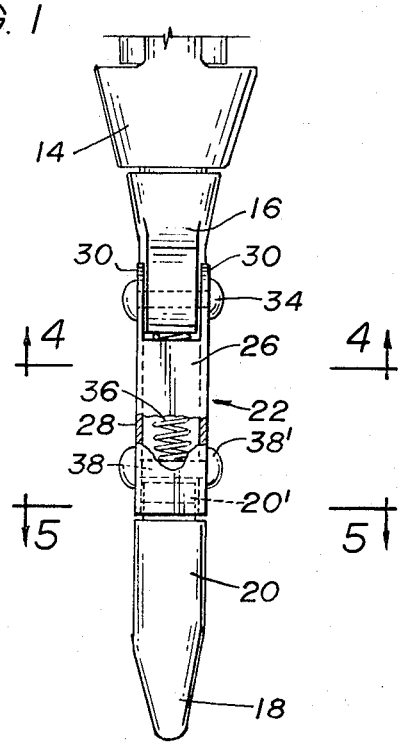
FIG. 3 is a front elevation view of the hook of the present invention.
Figure 4:
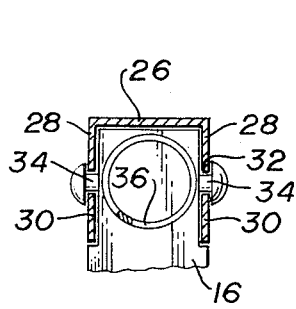
FIG. 4 is a cross-sectional view taken along line 4—4 of FIG. 3.
Figure 5:
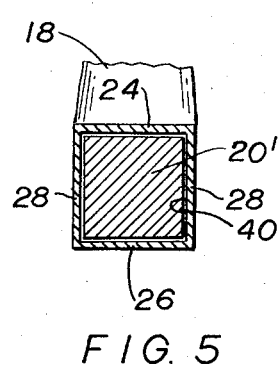
FIG. 5 is a cross-sectional view at enlarged scale taken along line 5—5 of FIG. 3.

Outwardly of cross pin 38 gate 22 defines a socket opening 40 which, as most clearly shown in FIG. 5, is sized interiorly to embrace a portion 20' of tip 20 that has a cross-sectional area of reduced size and shape to establish an embracing connection between the gate socket and the hook tip. Spaced inwardly of the hook tip the cross-sectional shape of tip 20 is so formed that when gate 22 is in a closed position a smooth, discontinuity-free fit is provided between the two portions. See FIGS. 1 and 3.

Figure 2:
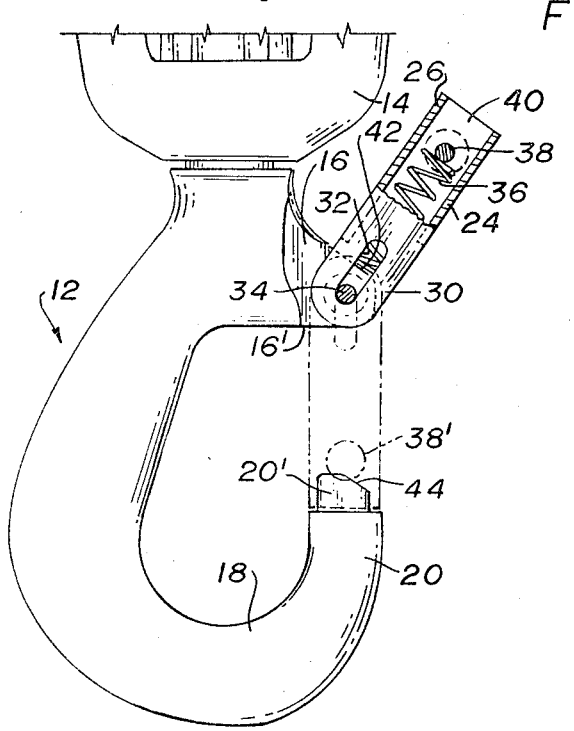
FIG. 2 is a side elevation view of the hook of the present invention at enlarged scale with portions of the gate being broken away to reveal internal details.

It will now be appreciated, when gate 22 is in the closed or throat bridging position, that movement of the gate against the force of spring 36 will permit hinge portions 30 of the gate to move with respect to pin 34 until the gate socket 40 is disengaged from tip 20', at which position the gate can be swung outwardly to the position shown in solid lines in FIG. 2. The heel surface effects a further camming action by defining a flat planar portion 42 at a position on the heel remote from the throat opening so that the force of spring 36 against flat surface 42 tends to retain the gate in the open position until intentionally rotated, clockwise as viewed in FIG. 2, to effect closure of the gate. Planar surface portion 42 is so oriented with respect to surface portion 16' that gate 22 will be at least 90° from the closed or throat spanning position when it extends normal of surface 42, so that when the gate is moved to the latter position, unobstructed access to the hook throat can be had. In the exemplary structure of FIG. 2, surface 42 is oriented so that a line normal thereto is approximately 130°–160° from the throat opening, which is normal to surface 16'. The heel surface intermediate planar surfaces 16' and 42 is formed arcuately to expedite pivotal movement of the gate between throat bridging and throat clearing positions.

Tip portion 20' is provided with a ramp surface 44 which assists in closing the gate. It will be noted that the ramp does not extend to the line of demarcation between tip portion 20' and tip 20, thereby preserving the embracing relation between tip portion 20' and socket 40 when the gate is in a throat bridging position.

In operation, the hook of the present invention can be readily opened by movement of gate 22 against the force of spring 36 in response to finger pressure applied on protruding heads 38'. When socket opening 40 of the gate is clear of tip portion 20', the hook can be pivoted or swung outwardly to clear the throat opening and admit a load into the hook basket. The presence of flat cam surface 42 assists in retaining the gate in an open position for ready placement of a load into the hook. A load such as a bundle of wire conductors W intended for placement in a conduit C is then engaged in basket 18, and gate 22 is swung to a closed position. Because of the presence of ramp 44 only slight finger pressure against the force of spring 36 is needed to position the gate for easy sliding movement up the ramp. When the gate is so positioned that socket opening 40 is directly opposite tip portion 20', spring 36 forces the socket into embracing relation of tip portion 20'. Because ramp 44 terminates above the inner extremity of tip portion 20', a secure engagement between the gate and the hook body is assured. The load can then be pulled, for example by applying force to a pulling line L to move the load in the desired direction. It will be noted that should any obstruction be encountered so that force is applied against hinge plates 30 of the gate, such force will tend to close more firmly the gate rather than tending to open it. A similar advantage is provided when the hook is being used to hoist a load in an environment wherein guy wires and the like are present. Any guy wires contacting the gate will tend to close the gate rather than to open it.

Thus, it will be seen that the present invention provides a safety hook and gate which is firmly closed against forces imparted thereto by obstructions encountered in hoisting and which gate is quickly and readily opened for insertion or removal of the load. Moreover, the gate and hook structure are so constructed that no protruding portions are formed which would tend to snag the hook on any obstructions.

Although one embodiment of the present invention has been shown and described it will be obvious that other adaptations and modifications can be made without departing from the true spirit and scope of the invention.

What is claimed is:

1. A pulling hook comprising a hook body having a heel portion, a curved basket forming portion, and a tip at the end of the basket forming portion opposite the heel portion to define a throat opening therebetween; means adjacent said heel portion for effecting attachment of a pulling line to said hook body; a single rigid elongated hollow gate for spanning said throat opening; means for pivotally joining said gate to said heel portion, said joining means including a pin having ends protruding from opposite sides of said heel portion, there being opposed elongate slots in said hollow gate slidably engaged on said protruding ends to afford sliding movement of said gate between a throat spanning position and a throat clearing position; a rigid pin extending across and secured to said gate adjacent the free end thereof, said pin having enlarged head portions exterior of said gate for affording a finger grip thereon; and a compression spring, having first and second ends, disposed within said gate longitudinally thereof, said first end bearing directly against said heel portion and said second end bearing against said pin for resiliently biasing said gate member toward the throat spanning position; said gate having on the free end thereof a socket opening outwardly of said pin, said hook tip having on the end thereof a portion of reduced cross section for circumscription by said gate socket when said gate is in the throat spanning position.

2. A hook according to claim 1 wherein said heel portion includes a cam surface for bearing said compression spring slidably thereagainst, said cam surface having a first planar portion disposed across the throat from said tip, a generally arcuate portion extending from said first planar portion outwardly of said throat opening, and a second planar surface portion formed at least 90° from said first planar portion.

3. A hook according to claim 1 wherein in the outer surface configuration of said gate member at the end thereof proximate said socket opening is formed substantially identically to the surface configuration of said hook tip contiguous to said portion of reduced cross-sectional size so that when said gate member is disposed in a throat spanning position a substantially discontinuity free joint is formed between said gate member and said tip.

4. A hook according to claim 1 wherein the surface of said tip opposing said heel portion across the throat opening defines a ramp for urging said gate longitudinal against said resilient biasing means in response to pivotal movement of said gate to the throat spanning position.

5. A pulling hook comprising a hook body having a heel portion, a curved basket forming portion, and a tip at the end of the basket forming portion opposite the heel portion to define a throat opening therebetween; means adjacent said heel portion for effecting attachment of a pulling line to said hook body; a gate member for spanning said throat opening, said gate member having opposing side walls and opposing end walls formed in a generally square cross-section hollow body; means for pivotally joining said gate to said heel portion, said joining means including a pin having ends protruding from opposite sides of said heel portion, there being opposed elongate slots in said side walls of said gate member slidably engaged on said protruding ends to afford sliding movement of said gate member between a throat spanning position and a throat clearing position; a compression spring disposed within said gate longitudinally thereof for resiliently biasing said gate member toward the throat spanning position, a cross pin extending between said side walls within said gate for supporting said spring adjacent the free end of said gate, said cross pin having enlarged head portions exterior of said side walls for affording a finger grip on said gate, said gate member having on the free end thereof a socket opening outwardly of said cross pin, said hook tip having on the end thereof a generally square portion of reduced cross-section for circumscription by said gate member socket when said gate is in the throat spanning position.

References Cited

UNITED STATES PATENTS

| | | | |
|---|---|---|---|
| 28,669 | 6/1860 | Henshaw | 24—239 |
| 302,509 | 7/1884 | Mauthner. | |
| 1,194,005 | 8/1916 | From | 24—241 |
| 1,324,676 | 12/1919 | Knudsen | 24—24* |

FOREIGN PATENTS

| | | |
|---|---|---|
| 4,823 | 1883 | Great Britain. |
| 4,258 | 1894 | Great Britain. |
| 804,454 | 11/1958 | Great Britain. |

DONALD A. GRIFFIN, *Primary Examiner*.